UNITED STATES PATENT OFFICE.

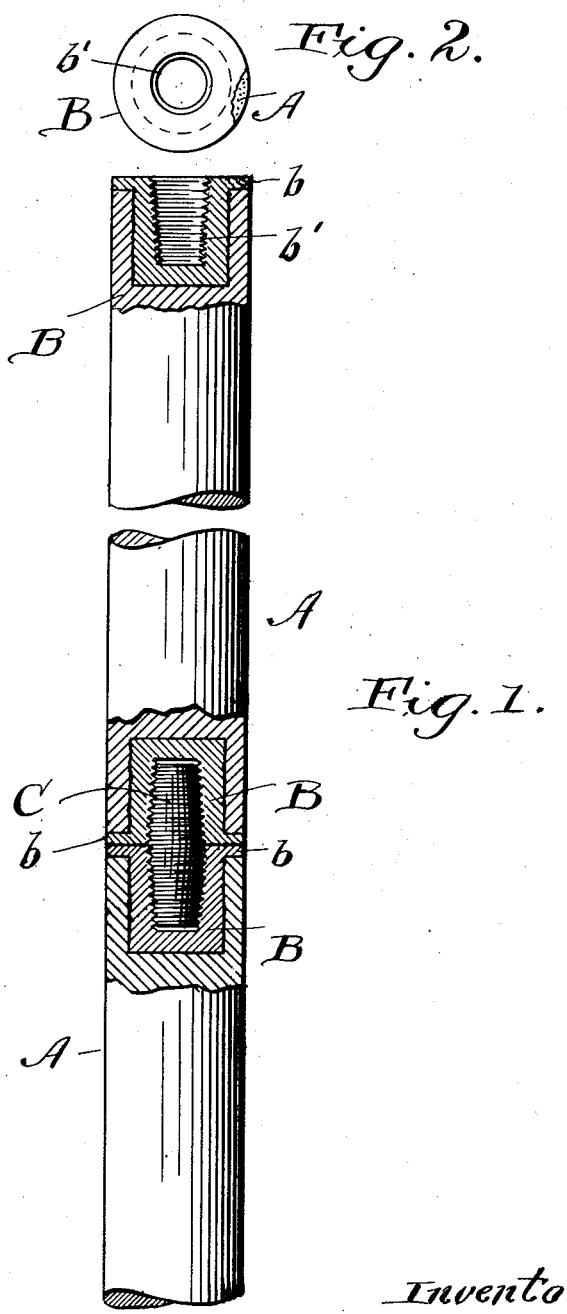

MINER W. ALLEN, OF LAKEWOOD, OHIO, ASSIGNOR TO NATIONAL CARBON COMPANY, OF CLEVELAND, OHIO, A CORPORATION OF NEW JERSEY.

CARBON ELECTRODE.

1,008,002.  Specification of Letters Patent.  Patented Nov. 7, 1911.

Application filed September 12, 1910. Serial No. 581,663.

*To all whom it may concern:*

Be it known that I, MINER W. ALLEN, a citizen of the United States, residing at Lakewood, in the county of Cuyahoga and State of Ohio, have invented a certain new and useful Improvement in Carbon Electrodes, of which the following is a full, clear, and exact description.

This invention relates to improvements in carbon electrodes, especially adapted for electric furnace work; and the object of the invention is to enable the connection together of such carbon electrodes, end to end, so as to prevent the waste which is now incident to the use of carbon electrodes in electric furnaces.

According to the present invention, each carbon electrode is provided at each end with a graphite block which is inset into the end of the electrode and preferably extends laterally so as to cover and intimately contact with the end of the electrode.

The invention consists in the said electrode and in the process of making the same, as hereinafter described and definitely pointed out in the claims.

In the drawing, Figure 1 represents one complete carbon electrode, and one partly consumed carbon electrode, constructed in accordance with the present invention and connected together end to end,—the joint between said electrodes being shown in sections. Fig. 2 is an end view of one of said electrodes.

Referring to the parts by letters, A represents an electrode made of carbon of suitable size and shape; B, B represent blocks of graphite which are inset into the ends of such carbon electrodes; in fact, such a block is inset into both ends of each electrode, and has a laterally projecting flange *b* which covers and is in intimate contact with the end of the electrode. *b'* represents a threaded hole which is machined in each of said blocks.

C represents a dowel pin, which is threaded from end to end and adapted to be screwed partly to the block B of one electrode and partly into the block B of the other electrode, whereby both electrodes are secured together, end to end, as shown; the end faces of said blocks being thereby drawn into good electrical contact.

In constructing carbon electrodes, such as above described, the green, that is to say, unbaked carbon electrode is formed, and a hole, preferably somewhat irregular in form, is formed in each of its ends. Then these holes are filled with a graphite mix substantially such as is used in making graphite electrodes,—the particular composition of which is well known to those familiar with this art. This graphite is so applied preferably while in a plastic condition; and after the hole is filled said plastic graphite is spread laterally over the ends of said electrode, which is preferably roughened whereby the graphite will adhere closely thereto. These graphite insets having been so put into these holes while the carbon and the graphite mix are unbaked, the electrode is now subjected to the curing action of the required heat. When they have been cured in this manner the graphite hardens and becomes a permanent part of the electrode. The required hole in its end may be drilled and threaded precisely as if the whole electrode were made of graphite, and the ends may be faced off smoothly. The dowel pin C is preferably made of graphite.

As above stated, two electrodes so constructed may now be connected end to end by screwing the dowel pin into the threaded holes of both electrodes, thereby drawing the electrodes together until their faced off graphite ends are in contact, and the external side surfaces of the electrodes are practical continuations of one another. When carbon electrodes are so made, all of each electrode may be used, whereas with such carbon electrodes as are most commonly used, a large part, namely, the part in and adjacent to the holder, has to be thrown away after the remainder has been used.

Having described my invention, I claim:

1. A carbon electrode for electric furnace work, comprising a body made of suitable carbon mix and a block of graphite inset and permanently fixed to the end thereof, and a device for engaging said graphite blocks for connecting the end of said electrode with another electrode.

2. A carbon electrode for electric furnace work, comprising a carbon body having a graphite block which is inset and permanently fixed in the end thereof and has a laterally extended flange which covers and lies in intimate contact with the end of the carbon body.

3. A carbon electrode for electric furnace work, comprising a body having a graphite block inset into one end which block has a threaded hole, and a threaded dowel pin screwed into said hole.

4. The herein described process for making carbon electrodes for electric furnace work, which consists in forming the carbon electrode with a hole in one end, in packing into said hole, while the carbon electrode is green, a plastic graphite mixture, and in subsequently curing the electrode so formed.

In testimony whereof, I hereunto affix my signature in the presence of two witnesses.

MINER W. ALLEN.

Witnesses:
H. R. SULLIVAN,
E. L. THURSTON.